Figure 1:
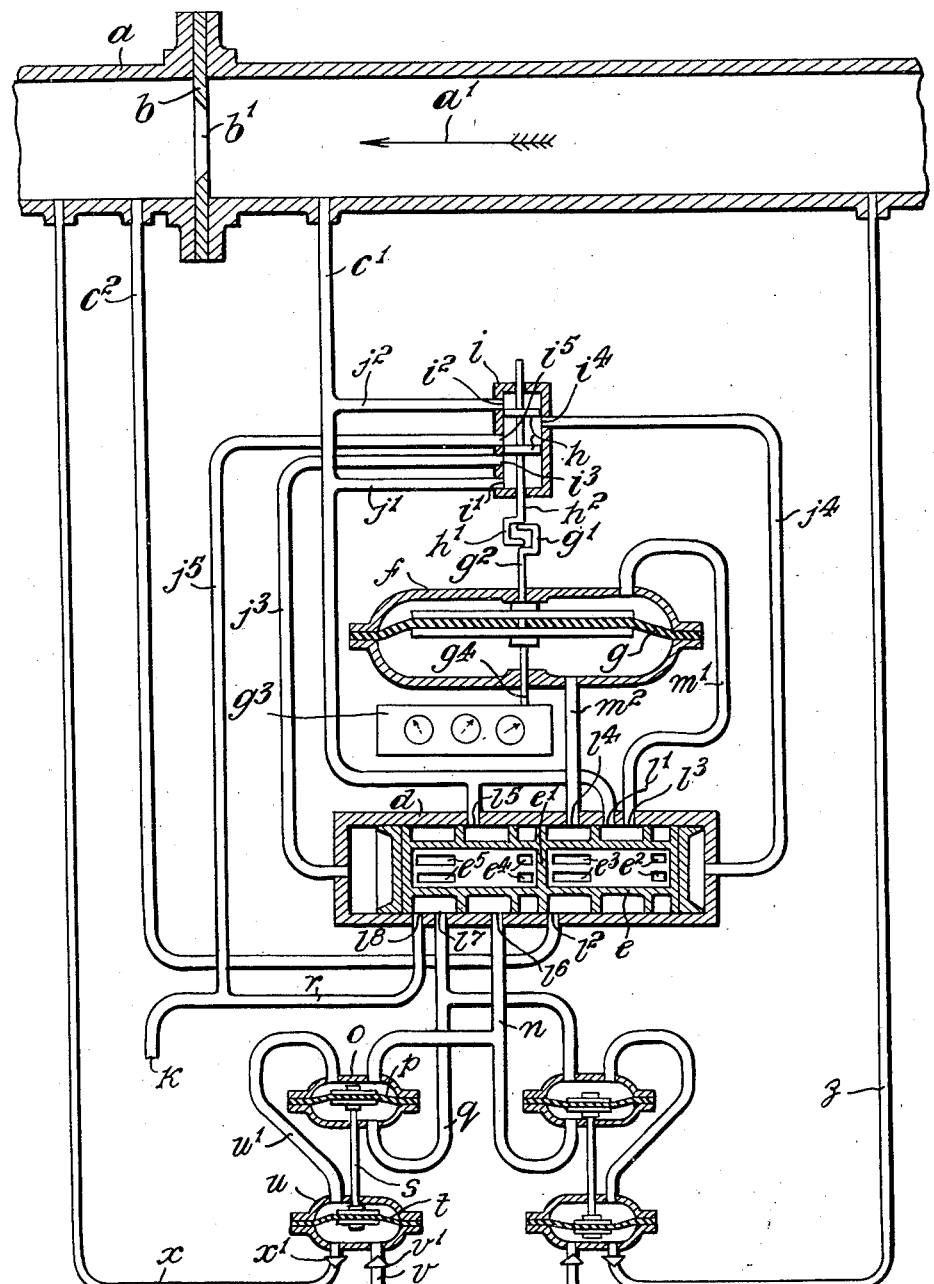

July 20, 1948.  G. SMILLIE  2,445,540
APPARATUS FOR INJECTING LIQUID CHEMICALS
INTO A FLOWING STREAM
Filed June 14, 1945  2 Sheets-Sheet 1

Inventor.
GEORGE SMILLIE
By: Francis E. Boyce
ATTORNEY.

Inventor.
GEORGE SMILLIE.
By: Francis E. Boyce
ATTORNEY.

Patented July 20, 1948

2,445,540

UNITED STATES PATENT OFFICE 2,445,540

APPARATUS FOR INJECTING LIQUID CHEMICALS INTO A FLOWING STREAM

George Smillie, London, England

Application June 14, 1945, Serial No. 599,357

1 Claim. (Cl. 137—165)

This invention relates to an apparatus for injecting liquid chemicals into a pipe in direct proportion to the rate of flow of the liquid through the pipe.

The object of the invention is to provide such an injection apparatus having a metering apparatus which is accurately responsive in direct proportion to the flow of the liquid in the pipe.

If a constriction, such as an orifice plate or a Venturi tube, is provided in a pipe through which a liquid flows, such as a water main, a drop in the pressure of the liquid is caused, between the pressure upstream of the constriction and the pressure downstream thereof, which is proportional to the quantity of the liquid flowing through the constriction in the pipe.

Also if a by-pass is made from the upstream side of the constriction to the downstream side thereof, for instance these points are interconnected by a pipe of considerably smaller diameter, the flow in such by-pass will be directly proportional to the flow in the main pipe, as long as the liquid flow in the main pipe is turbulent and provided the by-pass flow is small relatively to the flow in the main pipe.

To respond directly proportionally to the flow in the by-pass and main pipe, a metering apparatus connected in the by-pass must not impose any appreciable load on the liquid flowing therethrough, otherwise such constant load will prevent proportional response at different rates of flow. The metering apparatus must also be of a positive type and not an inferential type such as a vaned wheel, wherewith different degrees of slip under different rates of flow prevent true proportional response.

More particularly, the object of the invention is to provide, in a by-pass of such an injection apparatus between the two sides of a constriction in a main pipe through which a liquid flows, a positive metering apparatus which imposes only a negligible load on the liquid flowing in the by-pass so that the response to such flow is practically directly proportional to such flow and, consequently, is also practically directly proportional to the flow through the constriction in the main pipe.

According to the invention, a metering apparatus connected in a by-pass pipe interconnecting the two sides of a constriction in a main pipe through which a liquid flows, consists of a chamber divided by a flexible diaphragm connected to a pilot slide valve controlling the admission of pressure liquid from the main pipe to, and the exhaust of liquid to atmosphere from, and displacing alternately in opposite directions, a main slide valve changing over the connection of opposite sides of the diaphragm to the main pipe alternately to upstream and to downstream of the constriction.

Thus the differential pressure between the upstream and downstream sides of the constriction in the main pipe solely has to displace the diaphragm and pilot valve. As the diaphragm can be of such area that the displacing force developed is large, the almost negligible although constant frictional resistance of the diaphragm and pilot valve, does not appreciably affect the directly proportional response of the metering apparatus to the flow of liquid in the main and by-pass pipes.

The pilot piston valve preferably is hydraulically balanced, to reduce the opposition thereof to displacement.

As the main valve is displaced by pressure fluid derived as a bleed from the main pipe but discharged to atmosphere, the liquid so used to displace the main valve is abstracted from the total flow and does not affect the constant proportionality of the flow in the by-pass to the flow through the constriction. Moreover, as the pressure liquid is bled from the main pipe and discharges to atmosphere, the pressure drop thereof effecting the displacement of the main valve, is considerably greater, being the drop to atmospheric of the pressure in the main pipe, than the mere differential pressure between the upstream and the downstream sides of the constriction in the main pipe.

The main slide valve is also used to control the supply and exhaust of pressure liquid from the main pipe to atmosphere, to and from pumping engines which inject liquid chemicals into the main pipe. Each of these pumping engines comprises a motive diaphragm connected to and displacing a pumping diaphragm.

Figure 2:
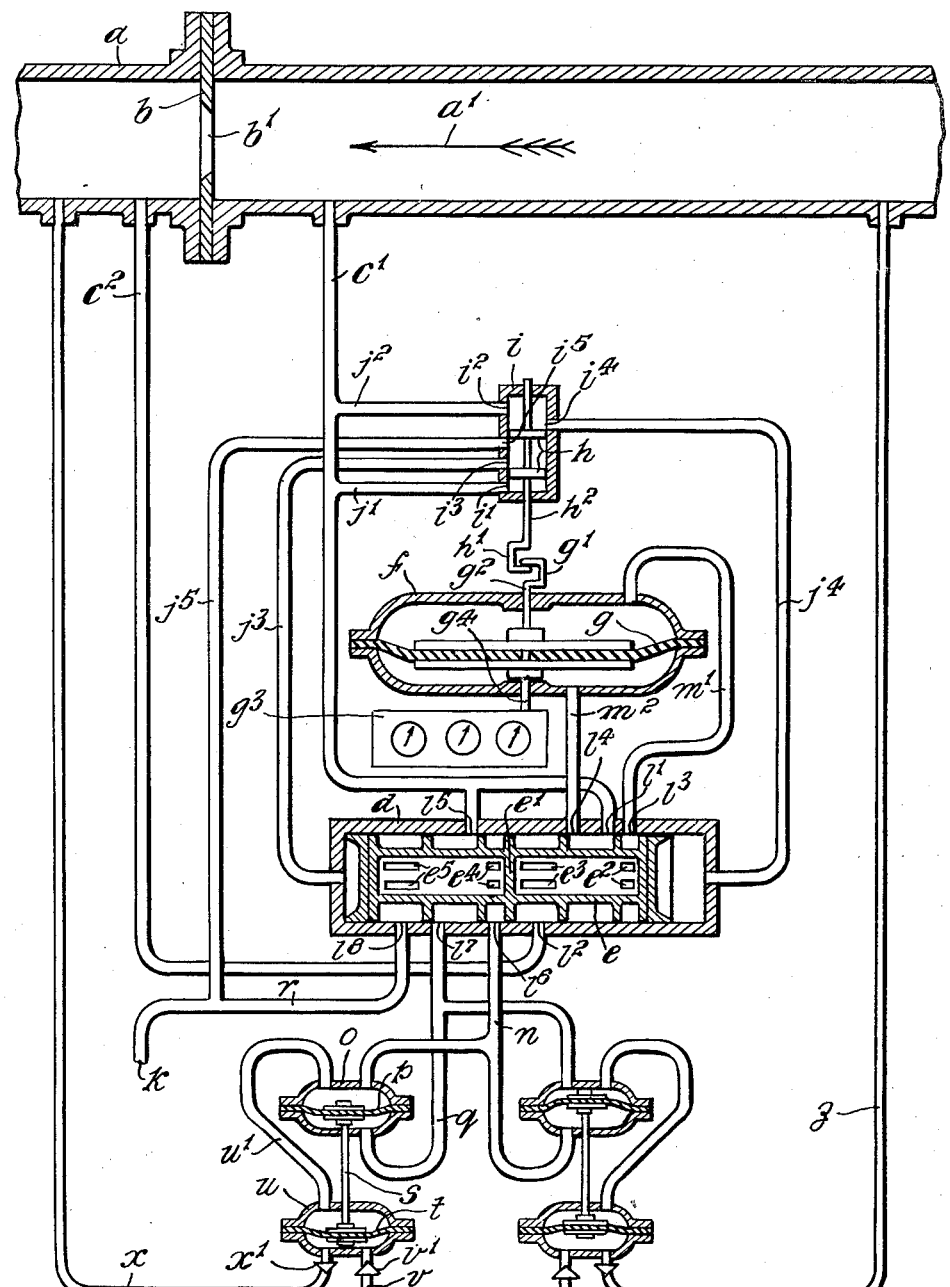

An injection apparatus for injecting liquid chemicals into a main pipe and embodying the invention, is illustrated, diagrammatically, by way of example, on the accompanying drawings, in which:

Fig. 1 is a diagrammatic sectional view of a liquid chemical dosing apparatus connected to, and operated by the pressure of water flowing in, a water main, and Fig. 2 is a view similar to Fig. 1 but showing the opposite phase of the working of the apparatus to that shown in Fig. 1.

$a$ is a water main, wherein water flows in the direction indicated by the arrow $a^1$.

$b$ is a plate formed with an orifice $b^1$ constricting the area of flow along the water main $a$, whereby a drop in the pressure of the water is caused between the water upstream of the orifice plate $b$ and the water downstream thereof.

$c^1$, $c^2$ are small diameter pipes connected to the main pipe $a$ respectively upstream and downstream of the orifice plate $b$. These two pipes $c^1$, $c^2$ together constitute a by-pass from the main pipe $a$, and wherein are included the cylinder $d$ of a change-over piston slide valve $e$, and a chamber $f$ divided by a flexible diaphragm $g$.

The change-over valve $e$ is alternately displaced to opposite ends of the cylinder $d$, by means which will be explained later. When the change-over valve $e$ is at the right hand end of the cylinder $d$ as shown in Fig. 1, the upper side of the diaphragm $g$ in the chamber $f$ is connected to the pipe $c^1$, whilst the lower side of the diaphragm $g$ is connected to the pipe $c^2$. Thus the upper side of the diaphragm $g$ is then subjected to the higher, upstream pressure whilst the lower side of the diaphragm $g$ is subjected to the lower, downstream pressure. The diaphragm $g$ is thereby displaced downwards from the position shown in Fig. 1 into the position shown in Fig. 2. By means of a tappet $g^1$ on a rod $g^2$ connected to the diaphragm $g$, and which encounters a tappet $h^1$ on a rod $h^2$ of a pilot piston slide valve $h$, sliding in a cylinder $i$, the pilot valve $h$ is displaced downwards from the position shown in Fig. 1 to the position shown in Fig. 2.

Ports $i^1$ and $i^2$ respectively one at each end of the pilot valve cylinder $i$ are connected by pipes $j^1$ and $j^2$ to the upstream pipe $c^1$. Ports $i^3$, $i^4$ each respectively near one of the ports $i^1$ and $i^2$, are connected by pipes $j^3$ and $j^4$ respectively to opposite ends of the cylinder $d$ of the change-over valve $e$. A port $i^5$ at the midlength of the pilot valve cylinder $i$ leads by a pipe $j^5$ to a drain $k$.

The upstream pipe $c^1$ is connected to a port $l^1$ in the change-over valve cylinder $d$, whereas the downstream pipe $c^2$ is connected to a port $l^2$ in the change-over valve cylinder $d$.

A port $l^3$ in the change-over valve cylinder $d$ is connected by a pipe $m^1$ to the chamber $f$ above the diaphragm $g$, whereas another port $l^4$ in the change-over valve cylinder $d$ is connected by a pipe $m^2$ to the chamber $f$ beneath the diaphragm $g$.

The change-over piston slide valve $e$ is hollow with closed ends, and its hollow interior is divided by a transverse partition $e^1$. Ports $e^2$ and $e^3$ provide communication between the right hand portion of the hollow interior of the change-over valve $e$ and annular grooves in the outer periphery of the valve $e$ at the two ends of such right hand portion of its hollow interior.

When the parts are in the position shown in Fig. 1, the pilot valve $h$ will have placed the ports $i^1$ and $i^3$ in intercommunication and thereby will have just admitted pressure water from the upstream pipe $c^1$ and pipe $j^1$ to the pipe $j^3$ to force the change-over valve $e$ to the right into the position shown in Fig. 1. The change-over valve then places the pipes $c^1$ and $m^1$ in intercommunication, by means of an annular groove in its periphery registering with both the ports $l^1$ and $l^3$, whereby pressure water from the pipe $c^1$ is admitted to the chamber $f$ above the diaphragm $g$. At the same time an annular groove in the periphery of the change-over valve $e$ registers with both the ports $l^2$ and $l^4$ and places the chamber $f$ beneath the diaphragm $g$ in communication with the downstream pipe $c^2$ through the pipe $m^2$. The diaphragm $g$ is then displaced by the difference of pressure upstream and downstream of the orifice plate $b$, into the position shown in Fig. 2.

On the diaphragm being displaced downwards into the position shown in Fig. 2, the tappet $g^1$ on its rod $g^2$ encounters, as above mentioned, the tappet $h^1$ on the rod $h^2$ of the pilot valve $h$ and displaces the pilot valve $h$ downwards into the position shown in Fig. 2. The pilot valve $h$ then places the ports $i^2$ and $i^4$ in intercommunication whereby upstream pressure water is admitted from the upstream pipe $c^1$ and pipe $j^2$ to the pipe $j^4$ to force the change-over valve $e$ to the left into the position shown in Fig. 2. A groove in the change-over valve $e$ then places the ports $l^1$ and $l^4$ in intercommunication, whereupon upstream pressure water is admitted by the pipe $m^2$ to the chamber $f$ beneath the diaphragm $g$. At the same time a groove in the change-over valve $e$ and the ports $e^2$ and $e^3$ and the right hand portion of the hollow interior of the change-over valve $e$, have placed the ports $l^3$ and $l^2$ in intercommunication whereby the water in the chamber $f$ above the diaphragm $g$ can exhaust by the pipe $m^1$ into the downstream pipe $c^2$. The diaphragm $g$ is then displaced upwards by the differential pressure into the position shown in Fig. 1.

On being displaced upwards the tappet $g^1$ on its rod $g^2$ eventually encounters another shoulder of the tappet $h^1$ on the rod $h^2$ of the pilot valve $h$, which it forces upwards into the position shown in Fig. 1. The cycle of operations described then recommences.

From the foregoing description it will be appreciated that the sole work which the differential pressure in the pipes $c^1$ and $c^2$ by-passing the orifice plate $b$ has to do is to displace the diaphragm $g$ and pilot valve $e$. The change-over valve is displaced by pressure water run to waste and exhausting to atmospheric pressure. The diaphragm $g$ can be of relatively large area so that the displacing force is large relatively to the resistance to displacement of the pilot valve $h$ to be overcome. Also the pilot valve $h$ is hydraulically balanced. In consequence, therefore, the opposition to the flow in the by-pass $c^1$, $c^2$ is so small as to be negligible in affecting the direct proportionality thereof to the flow in the main pipe $a$.

In addition to effecting the change-over of the connections to and from the diaphragm chamber $f$, the change-over valve $e$ also effects the change-over of connections to pumping engines which inject liquid chemicals into the main pipe $a$ proportionally to the flow therein. For this purpose the left hand portion of the change-over valve cylinder $d$ is provided with further ports $l^5$, $l^6$, $l^7$ and $l^8$, and the left hand portion of the hollow interior of the change-over valve $e$ is provided with ports $e^4$ and $e^5$.

The upstream pipe $c^1$ is connected to the port $l^5$, and when the change-over valve $e$ is in the right hand end position in its cylinder $d$, an annular groove in the change-over valve $e$ places the upstream pipe $c^1$ in communication with the port $l^6$. From this port $l^6$, a pipe $n$ leads to a chamber $o$ divided by a flexible diaphragm $p$. On the other side of the diaphragm $p$, the chamber $o$ is connected by a pipe $q$ to the port $l^7$, and the port $l^8$ is connected by a pipe $r$ to the drain $k$.

The pressure water admitted from the upstream pipe $c^1$ by the intercommunicating ports $l^5$ and $l^6$, to the upper side of the diaphragm chamber $o$, displaces the diaphragm $p$ from the position shown in Fig. 1 into the position shown in Fig. 2.

When the change-over valve $e$ is in the left hand end position shown in Fig. 2, an annular groove in the change-over valve $e$ interconnects the ports $l^5$ and $l^7$ whereby the upstream pipe is placed in intercommunication with the pipe $q$ leading to the respective side of the diaphragm $p$. At the same time the pipe $n$ leading from the other side of the diaphragm $p$ is connected to the drain $k$, by a groove in the change-over valve $e$ uncovering the port $l^6$ so that, through the ports $e^4$ and $e^5$ and the left hand portion of the hollow interior of the change-over valve $e$, the port $l^6$ communicates with the port $l^8$ connected to the pipe $r$ leading to the drain $k$.

The diaphragm $p$ is connected by a rod $s$ to a diaphragm $t$, in and dividing a pumping chamber $u$. This pumping chamber $u$ is connected on one side of the diaphragm $t$ by a pipe $u^1$ to the corresponding side of the diaphragm chamber $o$, so that like pressure conditions reign at this side of both diaphragms $p$ and $t$. On the other side of the diaphragm $t$ the diaphragm chamber $u$ is connected by a pipe $v$ to a tank $w$ containing liquid chemical and by a pipe $x$ to the water main $a$. A non-return valve $v^1$ opening towards the diaphragm chamber $u$ is provided in the pipe $v$, and a non-return valve $x^1$ opening towards the water main $a$ is provided in the pipe $x$.

The diaphragm $p$ in its displacements displaces the diaphragm $t$ to pump liquid chemical, for instance a chlorine solution, from the tank $w$ into the stream of water flowing in the main $a$.

The pumping stroke of the diaphragm $t$ is supported by pressure water on the other side of the diaphragm admitted by the pipe $u^1$. Thus the liquid chemical on one side of the diaphragm $t$ is subjected to a pumping effort exerted by pressure water derived from the main $a$ on both the diaphragms $p$ and $t$. The liquid chemical is therefore readily injected into the main $a$.

As the pressure water from the motive diaphragm chamber $o$ and the pressure water from the supporting side of the diaphragm chamber $u$ exhaust to the drain, the pumping load cannot affect the proportionality of the response to the flow in the by-pass $c^1$, $c^2$.

As can be seen on the right of Figs. 1 and 2, the motive and pumping chambers and diaphragms and pressure water and exhaust connections, are duplicated for pumping another liquid chemical from a tank $y$, for instance containing an ammonia solution, to be delivered to the main $a$ by a pipe $z$.

This second pumping installation is like and operates the same as the installation connected to chlorine tank $w$, and therefore needs no detailed description.

The displacements of the diaphragm $g$ are recorded by an integrating device or counter $g^3$ operated by the reciprocation of a rod $g^4$ connected to the diaphragm $g$.

I claim:

In a metering apparatus responding directly proportionally to the flow of a liquid in a main pipe, means constricting the flow in said main pipe, a pipe connected to said main pipe upstream of said flow constriction, a pipe connected to said main pipe downstream of said flow constriction, a chamber divided by a flexible diaphragm, a change-over slide valve alternately displaced in opposite directions by the alternate application of pressure liquid from said main pipe and the alternate exhausting of said liquid to atmosphere and controlling the connection of said chamber at opposite sides of said diaphragm alternately and oppositely to said upstream and downstream connected pipes, a pilot slide valve displaced by said diaphragm and controlling the supply of said pressure liquid to said change-over valve and the exhaust thereof therefrom to atmosphere, a second chamber divided by a flexible diaphragm and at opposite sides of its diaphragm connected by said change-over valve alternately to said main pipe and to the atmosphere, a third chamber divided by a flexible diaphragm mechanically coupled to said diaphragm dividing said second chamber and at one side of its diaphragm alternately connected by said change-over valve to said main pipe and to the atmosphere, a suction pipe connected to said third chamber at the other side of its diaphragm, a non-return valve in said suction pipe and opening towards said third chamber, a delivery pipe connected to said third chamber on said other side of its diaphragm and to said main pipe, and a non-return valve in said delivery pipe and opening towards said main pipe.

GEORGE SMILLIE.

REFERENCES CITED

The following references are of record in the file of this patent:

UNITED STATES PATENTS

| Number | Name | Date |
|---|---|---|
| 1,515,988 | Armstrong et al. | Nov. 18, 1924 |
| 1,611,008 | Earl | Dec. 14, 1926 |
| 2,090,069 | Richardson et al. | Aug. 17, 1937 |
| 2,183,374 | Walker | Dec. 12, 1939 |
| 2,277,714 | Polston et al. | Mar. 31, 1942 |
| 2,391,703 | Hughes | Dec. 25, 1945 |

FOREIGN PATENTS

| Number | Country | Date |
|---|---|---|
| 93,395 | Sweden | 1938 |
| 627,016 | Germany | 1936 |